(12) United States Patent
Loboz et al.

(10) Patent No.: US 7,058,646 B1
(45) Date of Patent: Jun. 6, 2006

(54) REDUCING DATABASE REORGANIZATION TIME BY COLUMN MANIPULATION

(75) Inventors: Charles Zdzislaw Loboz, West Ryde (AU); Jonatan Kelu, Granville (AU); Rajan Sahu, Carlingford (AU)

(73) Assignee: Unisys Corporation, Blue Bell, PA (US)

(*) Notice: Subject to any disclaimer, the term of this patent is extended or adjusted under 35 U.S.C. 154(b) by 525 days.

(21) Appl. No.: 10/392,405

(22) Filed: Mar. 19, 2003

(51) Int. Cl.
*G06F 17/30* (2006.01)

(52) U.S. Cl. ............... 707/101; 707/102; 707/103 R; 707/104.1; 707/203; 707/204

(58) Field of Classification Search ............. 707/9, 707/101, 102, 103 R, 204, 104.1, 203
See application file for complete search history.

(56) References Cited

U.S. PATENT DOCUMENTS

| | | | |
|---|---|---|---|
| 5,396,623 A * | 3/1995 | McCall et al. ............... 707/101 |
| 6,151,608 A * | 11/2000 | Abrams ....................... 707/204 |
| 6,205,451 B1 * | 3/2001 | Norcott et al. ............... 707/204 |
| 6,411,959 B1 * | 6/2002 | Kelsey ........................ 707/101 |
| 6,622,152 B1 * | 9/2003 | Sinn et al. ................... 707/204 |
| 2003/0028548 A1 * | 2/2003 | Nye ............................ 707/101 |
| 2003/0101194 A1 * | 5/2003 | Rys et al. .................... 707/101 |
| 2003/0135518 A1 * | 7/2003 | Anglin et al. ............. 707/104.1 |
| 2003/0154197 A1 * | 8/2003 | Millet et al. .................... 707/9 |
| 2004/0064487 A1 * | 4/2004 | Nguyen et al. ............. 707/204 |
| 2005/0138064 A1 * | 6/2005 | Trappen et al. ......... 707/103 R |

\* cited by examiner

*Primary Examiner*—Thuy N. Pardo
(74) *Attorney, Agent, or Firm*—Alfred W. Kozak; Mark T. Starr

(57) ABSTRACT

The invention provides a system and method for modifying a database. The method, in one aspect, comprises the steps of unloading data values from a column in a table, creating a new column, and loading the unloaded data values to the new column, wherein the number of columns from which data is unloaded is less than but not equal to the number of columns that comprise the table.

8 Claims, 1 Drawing Sheet

REDUCING DATABASE REORGANIZATION TIME BY COLUMN MANIPULATION

FIELD OF THE INVENTION

Figure 1:
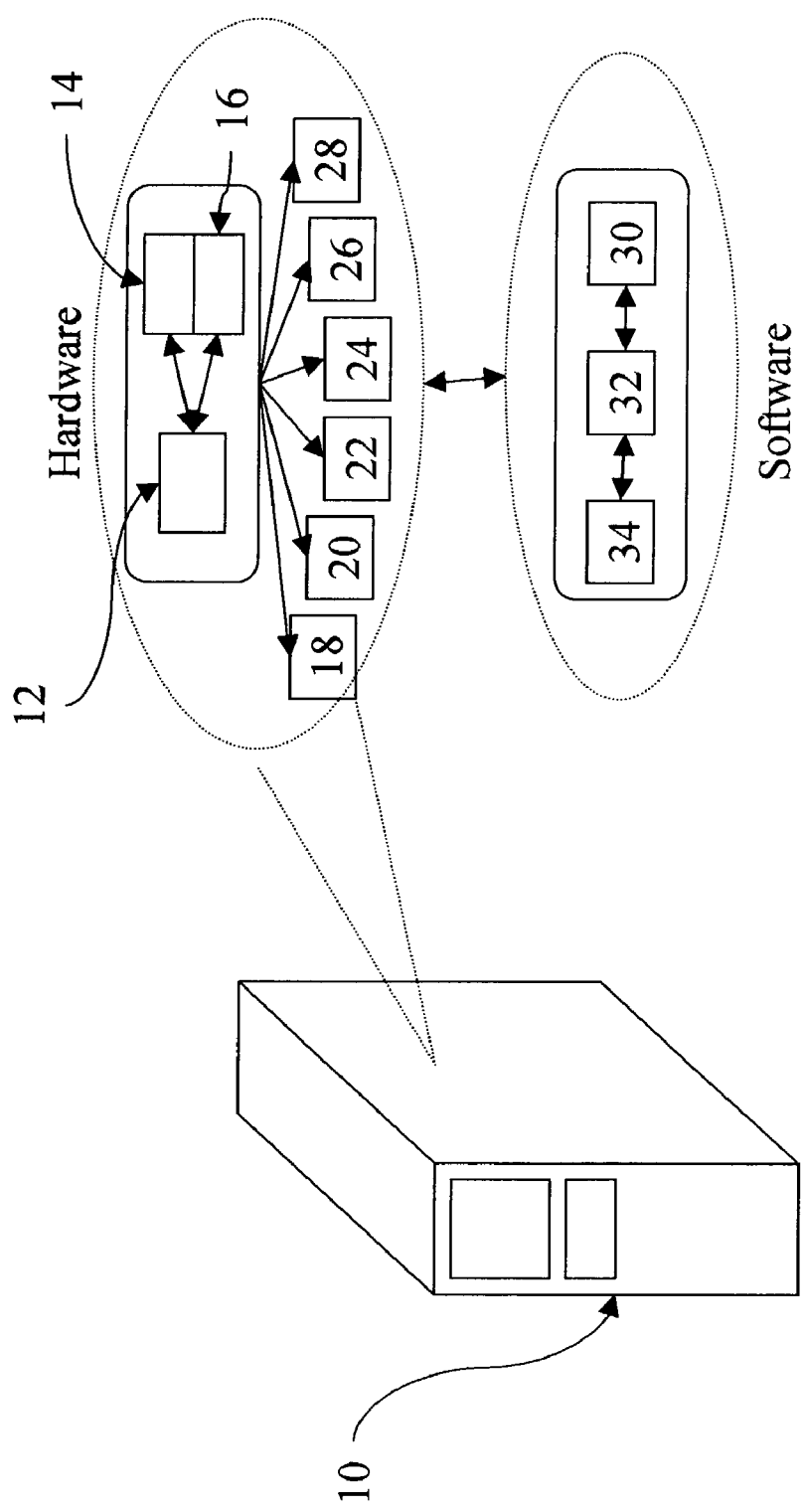

The present invention relates to a system and method for the reduction of total downtime during a database reorganization.

BACKGROUND OF THE INVENTION

Many large and small businesses operate computer based databases to track and record several aspects of their business. For example, it is quite common for a business to keep a computer based database which contains a record of their regular clients, with details such as the customers name, address, contact numbers (such as telephone and fax numbers), contact email address, etc.

As the business grows and evolves, or customer requirements change, the type of information recorded in the database may need to be modified to reflect this change. For example, a customer may move to a different address, or change their company name, or their contact details. Such changes may simply require the updating of data values within the database, and can usually be accomplished without any serious problems.

There are other complex situations, however, where a major reorganisation of the database is required to ensure that the database remains relevant and useful for the business. For example, when a new form of communication is developed, this may result in the need for the provision of an extra field in the database to hold the new information. An example of such a development is email.

In another more complex example, a customer may decide that they require deliveries to two separate addresses, creating the requirement for an extra "address" field in the database.

In a final example, the type of data held in a data field or column may also change. For example, a data field that was previously only arranged to hold integer values may need to be modified to hold character values.

Such complex changes necessitate a change in the underlying structure of the database. For example, a database such as a relational database is comprised of a large number of tables, each table being divided into a number of columns, each column being divided up into a number of elements, each element being arranged to house a data value. Furthermore, each table in the database may be linked to other tables via devices such as pointers. That is, some elements in the table may not contain data values per se, but contain values that "point" or link one table to another table.

Therefore, when a table is to be modified, any data currently held in the table must be preserved to prevent accidental loss of the data. This is usually achieved by temporarily shutting down the database, unloading the data from the affected table(s), performing the required database modifications, and re-loading the data into the newly created database structure. To ensure that data integrity is maintained, it is necessary to prevent users from accessing the database during such modifications and reorganisations. This "downtime" should be preferably minimised, as many large companies cannot effectively function when their database is not accessible.

Therefore, as a general proposition, it is desirable to reduce the amount of time required to effect a database reorganisation.

SUMMARY OF THE INVENTION

In a first aspect, the present invention provides a method of modifying a database, comprising the steps of,
  verifying whether data values contained within a column in a table may be unloaded without affecting the integrity of the data contained in the database,
  unloading the data values from at least one column in a table,
  creating at least one new column, and
  loading at least a portion of the unloaded data values from the at least one original column to the at least one new column,
  wherein the number of columns from which data is unloaded is less than but not equal to the number of columns that comprise the table.

An advantage of the present invention is that it reduces the amount of "downtime" necessary to effect a database reorganization. The present invention preferably achieves this advantage by removing the need to unload the contents of an entire data table during a database reorganisation. Instead of unloading all data elements in a table, the method of the present invention preferably only requires that data be unloaded from the columns that are to be modified in the course of the database reorganisation. This preferably reduces the total amount of data that must be unloaded and reloaded, which in turn preferably reduces the amount of time required for the database reorganisation to complete.

It will be understood that in the context of the present invention, a "column" will be understood to mean any grouping (or listing) of associated data values. An example of associated data values may be a list of customer names, or a list of customer addresses, etc.

In a second aspect, the present invention provides a method of modifying a database, comprising the steps of,
  unloading data values from at least one column in a table,
  creating at least one new column, and
  loading at least a portion of the unloaded data values from the at least one original column to the at least one new column,
  wherein the number of columns from which data is unloaded is less than but not equal to the number of columns that comprise the table.

In a third aspect, the present invention provides a system for modifying a database, comprising,
  means for verifying whether data values contained within at least one column in a table may be unloaded without affecting the integrity of the data,
  means for unloading the data values from the at least one column in a table,
  means for creating at least one new column, and
  means for loading at least a portion of the unloaded data values from the at least one column to the at least one new column,
  wherein the number of columns from which data is unloaded is less than but not equal to the number of columns that comprise the table.

In a fourth aspect, the present invention provides a system for modifying a database, comprising,
  means for unloading data values from at least one column in a table,
  means for creating at least one new column, and
  means for loading at least a portion of the unloaded data values from the at least one original column to the at least one new column, wherein the number of columns from which data is unloaded is less than but not equal to the number of columns that comprise the table.

In a fifth aspect, the present invention provides a computer program arranged, when loaded on a computing system, to implement a method in accordance with a first aspect of the invention.

In a sixth aspect, the present invention provides a computer readable medium providing a computer program in accordance with a fifth aspect of the invention.

In a seventh aspect, the present invention provides a computer program arranged, when loaded on a computing system, to implement a method in accordance with a second aspect of the invention.

In a eighth aspect, the present invention provides a computer readable medium providing a computer program in accordance with a seventh aspect of the invention.

DETAILED DESCRIPTION OF THE DRAWINGS

Features of the present invention will be presented in the description of any embodiment thereof, by way of example, with reference to the accompanying drawings, in which:

FIG. 1 illustrates a general purpose computer that may be used to implement the present invention.

DESCRIPTION OF THE PREFERRED EMBODIMENT

At FIG. 1 there is shown a schematic diagram of a computing system 10 suitable for use with an embodiment of the present invention. The computing system 10 may be used to execute applications and/or system services such as deployment services in accordance with an embodiment of the present invention. The computing system 10 preferably comprises a processor 12, read-only memory (ROM) 14, random access memory (RAM) 16, and input/output devices such as disk drives 18, keyboard 22, mouse 24, display 26, printer 28. The computer includes programs that may be stored in RAM 16, ROM 14, or disk drives 18 and may be executed by the processor 12. A communications link 20 connects to a computer network but could be connected to a telephone line, an antenna, a gateway or any other type of communications link. Disk drives 18 may include any suitable storage media, such as, for example, floppy disk drives, hard disk drives, CD ROM drives or magnetic tape drives. The computing system 10 may use a single disk drive 18 or multiple disk drives. The computing system 10 may use any suitable operating systems 30, such as Windows™ or Unix™.

The system further comprises a database 32. The database may be any appropriate database, such as relational database or a hierarchal database. An embodiment of the present invention may be supplied as a software module 34 arranged to interact with the database.

In the prior art, there are enterprise computing systems which have a database which has a table with 100 columns and 1,000,000 rows, with an average of 10 bytes of data per column entry per row. That is, the total data contained in the table is 100*1,000,000*10=1,000,000,000 bytes.

In such prior art systems, a reorganisation operation that requires a change in one of the columns requires an operator to unload the data from the entire table, perform the reorganisation operation (i.e. modify the table structure), and reload the data into the modified table. If the data for the entire table is unloaded and reloaded, a total of 2,000,000,000 bytes of data are moved (1,000,000,000 on unload, and an equal amount on load).

The applicant contends that in many situations where a database is to be reorganised (i.e. where data needs to be unloaded and reloaded), generally only a small subset of a table's columns are affected by the reorganisation. Thus, the present invention, in at least a preferred embodiment, provides a method which allows an operator to unload only the data for the affected set of columns, reorganise the columns in an appropriate manner, and then reload the data into the reorganised columns, rather than unloading and reloading all data from the entire table.

Therefore, returning to the example database given above, if a database reorganisation affects only one column, the average amount of data per column is 1*1,000,000*10=10,000,000 bytes. Thus, to unload and load one column results in the movement of an average of 20,000,000 bytes of data (10,000,000 on unload and an equivalent amount on load). In other words, 100 times less data is moved. Thus the reorganisation operation completes 100 times faster. In other words, if the total time taken to unload a table is, on average, 10 hours, then reorganising one column would take 6 minutes. Consequently, if only one column, as opposed to the whole table, is unloaded and reloaded, the amount of time an application is off-line due to a database reorganisation is reduced.

An example of a situation when data needs to be unloaded and reloaded because the database doesn't provide the necessary functionality to perform the reorganisation operation without unloading and reloading the data is the case where the size of a character column in an Oracle database is reduced. Note that while this example uses a limitation of the Oracle database to illustrate an embodiment of the present invention, the present invention should not be construed as being limited to these particular database systems.

An embodiment of the present invention will now be described with reference to a specific implementation of the invention in a proprietary Unisys software application termed "Enterprise Application Environment" (EAE). EAE is a software application that is arranged to build and maintain enterprise applications, including software applications arranged to interface with a database. The following example illustrates, in psuedocode, the steps followed by EAE in carrying out the function of an embodiment of the present invention.

Firstly, EAE determines whether it is necessary to unload data by checking whether a column needs to be reorganised in such a way that it cannot be done without unloading the data from the whole table. This process involves the application of a set of defined criteria or rules, which check the type of operation to be performed and the relation between the column to be unloaded and other columns or data elements. The defined criteria or rules will vary depending on the type of database and the inherent limitations of the database and the database management system.

For example, one situation where only a column needs to be unloaded is where, in the Oracle database, the column is a varchar column (i.e. a column that contains characters) and its length is being reduced.

Another example is where the column is a text column in Microsoft SQL Server and the operator wishes to transform the text column into a varchar column).

These are merely two examples of the types of situations where only a column, rather than the entire table, can be reorganised. It will be understood that many other situations will arise where only a column need be organised, and as a preliminary step, an embodiment of the present invention will test (using the set or defined rules or criteria) whether the requested operation could be successfully performed by merely unloading a column in the database.

Secondly, for an individual table, EAE determines all of the column(s) for which data must be unloaded. This is a corollary step to step one.

Thirdly, EAE unloads the data from the column into a temporary holding space, such as a flat file.

Fourthly, EAE deletes the original column (in the situation when converting a Microsoft SQL Server text column to a varchar column) or clears the original columns by setting them all to NULL values (in the situation when shortening Oracle varchar columns).

Subsequently, EAE reorganises the original column(s) (by creating a new varchar column with the same name as the original column) that was deleted in the situation when converting an Microsoft SQL Server text column to a varchar column, or by shortening the Oracle varchar columns by executing an "ALTER COLUMN" type of SQL statement.

Lastly, EAE reloads the data into the newly reorganised column(s), thereby completing the operation.

The aforementioned example illustrates the application of at least an embodiment of the invention in addressing one of the limitations of the Oracle and Microsoft SQL Server databases. However, the abovementioned method in accordance with an embodiment of the invention can be employed to handle similar limitations of other databases.

Therefore, in at least a preferred embodiment, the present invention advantageously reduces the amount of time required to perform a database reorganisation, by only manipulating columns of data rather than entire tables of data. This in turn reduces the amount of time expended in shifting data from one location to another location. That is, the total time taken to reorganise the database is reduced, and consequently, the amount of "downtime" for the database is correspondingly reduced.

Modifications and variations as would be apparent to a skilled addressee are deemed to be within the scope of the present invention.

What is claimed is:

1. A method for modification of a database in a computing system, said method operating to reduce the amount of time required to effect said modification, comprising the steps of:
   verifying whether data values contained within an original column in a selected table may be unloaded without affecting the integrity of the data in the database;
   unloading the data values from at least one column in said table in said database;
   creating at least one new column in said selected table; and
   loading at least a portion of the unloaded data values from the at least one original column to the at least one new column;
   wherein the number of columns from which data is unloaded is less than but not equal to the number of columns that originally comprise the table.

2. A computer program arranged, when loaded on a computing system, to implement a method in accordance with claim 1.

3. A computer readable medium providing a computer program in accordance with claim 2.

4. A method of modifying a selected table in a database, in a computing system comprising the steps of:
   unloading data values from at least one original column in a selected table, in said database;
   creating at least one new column in said selected table, and
   loading at least a portion of the unloaded data values from the said at least one column to the said at least one new column,
   wherein the number of columns from which data is unloaded is less than but not equal to the number of columns that comprise said selected table.

5. A computer program arranged, when loaded on a computing system, to implement a method in accordance with claim 4.

6. A computer readable medium providing a computer program in accordance with claim 5.

7. A system for modifying a selected table in a database in a computing system which eliminates the need to transfer all values in all columns of a selected table to another table, comprising:
   means for verifying whether data values contained within at least one column in a selected table may be unloaded without affecting the integrity of the data, in said database;
   means for unloading said data values from the said at least one column in said selected table;
   means for creating at least one new column; and
   means for loading at least a portion of the unloaded data values from the said at least one column to the said at least one new column,
   wherein the number of columns from which data is unloaded is less than but not equal to the number of columns that comprise the said selected table.

8. A system for modifying a database in a computing system, comprising:
   means for unloading data values from at least one column in a selected table, in said database;
   means for creating at least one new column; and
   means for loading at least a portion of the unloaded data values from the said at least one original column to the said at least one new column;
   wherein the number of columns from which data is unloaded is less than but not equal to the number of columns that comprise the said selected table.

* * * * *